(12) United States Patent
Broeckx et al.

(10) Patent No.: US 7,897,555 B2
(45) Date of Patent: *Mar. 1, 2011

(54) MICROCAPSULES

(75) Inventors: Walter August Maria Broeckx, Newcastle upon Tyne (GB); Eva Martin Del Valle, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 297 days.

This patent is subject to a terminal disclaimer.

(21) Appl. No.: 10/900,944

(22) Filed: Jul. 28, 2004

(65) Prior Publication Data

US 2005/0026800 A1   Feb. 3, 2005

(30) Foreign Application Priority Data

Aug. 1, 2003   (EP) .................................... 03254825

(51) Int. Cl.
*A61K 8/11*   (2006.01)
*C11D 17/08*   (2006.01)
*C11D 3/14*   (2006.01)

(52) U.S. Cl. ......... 510/349; 510/296; 510/326; 510/348; 510/441; 510/446; 510/475; 424/408; 424/451; 424/462; 424/474; 424/490

(58) Field of Classification Search .................. 510/296, 510/326, 348, 349, 441, 446, 475; 424/408, 424/451, 462, 474, 490
See application file for complete search history.

(56) References Cited

U.S. PATENT DOCUMENTS

| | | | | |
|---|---|---|---|---|
| 4,708,816 A | * | 11/1987 | Chang et al. | ............. 252/186.25 |
| 5,470,512 A | | 11/1995 | Noji et al. | |
| 5,716,920 A | * | 2/1998 | Glenn et al. | ................. 510/159 |
| 5,932,528 A | | 8/1999 | Glenn, Jr. et al. | |
| 6,165,503 A | | 12/2000 | Dettmar et al. | |
| 6,733,790 B1 | * | 5/2004 | Garces Garces | ............. 424/497 |
| 6,855,691 B1 | | 2/2005 | Stamler | |

FOREIGN PATENT DOCUMENTS

| | | |
|---|---|---|
| DE | 10100689 A1 | 1/2001 |
| WO | WO 00/01373 | 1/2000 |
| WO | WO 03/000625 | 1/2000 |

* cited by examiner

*Primary Examiner* — Brian P Mruk
(74) *Attorney, Agent, or Firm* — Julia A. McConihay; Leonard W. Lewis; Steven W. Miller

(57) ABSTRACT

Microcapsules for use in liquid detergents having a core and a polyelectrolyte complex shell in the form of a semipermeable membrane comprising a particulate permeability-regulator. The invention also relates to a process for making the microcapsules and liquid detergents comprising said microcapsules.

17 Claims, No Drawings

MICROCAPSULES

CROSS REFERENCE TO RELATED APPLICATIONS

This application claims priority under 35 U.S.C. §119(a) to European Application Serial No. 03254825.7, filed Aug. 1, 2003.

TECHNICAL FIELD

The present invention is in the field of microcapsules, in particular it relates to microcapsules having low permeability, a process for making them and their use in liquid detergents for laundering, dishwashing and other purposes.

BACKGROUND OF THE INVENTION

Microcapsules are understood herein to be spherical beads with a diameter of from about 0.2 to about 5 mm, which contain a core surrounded by a membrane. The membrane protects the core and any active within the core from the surrounding medium. The use of microcapsules in liquid detergents is desirable not only for aesthetic reasons but also for the reduction of undesirable interactions between the core and liquid matrix, in particular decomposition of agents during long storage and incompatibility of individual components. Microcapsules also facilitate the handling of environmentally sensitive, biologically-active or hazardous materials such as enzymes, bleaching agents, redox materials, etc.

The use of microcapsules in liquid detergents is known from the literature. WO 00/46337 discloses a liquid detergent composition containing greater than 5% by weight of surfactant and an encapsulate containing greater than 10% by weight of active material and a cross-linked anionic gum. The anionic gum is cross-linked with a polyvalent cation, in preferred embodiments sodium alginate is cross-linked with calcium cations.

Calcium cross-linked encapsulates can be sensitive to chelants, such as those found in detergent compositions. Chelants can sequester calcium ions eroding the encapsulates and at the same time reducing the amount of chelant available for the cleaning process. Other mechanisms that can destroy alginate-based encapsulates is the substitution of calcium by other ions which have higher affinity for the alginate anions, such as sodium ions. The latter gives rise to sodium alginate which is soluble in water and therefore can lead to dissolution of the encapsulates.

Cross-linked encapsulates generally have a high porosity, not being suitable for low molecular active materials which can permeate through the pores.

If the level of cross-linking agent were such as to provide storage stability within the detergent composition, there is a risk that the encapsulates would not dissolve in the cleaning water, because calcium alginate is insoluble in water. In addition the calcium of the washing water may bind to the alginate giving rise to deposits on the cleaned articles.

WO 98/11870 discloses a liquid personal cleansing composition containing an encapsulated lipophilic skin-moisturizing agent. The lipophilic skin-moisturizing agent is encapsulated within a complex coacervate comprising a polycation and a polyanion. Encapsulates of this kind are not suitable for use in detergent compositions because the coascervate is so strong as not to release the active agent during the washing process.

WO 02/055649 discloses a method for the production of microcapsules containing washing and/or cleaning substances with semi-permeable capsule shells (membranes) by means of complexing suitable polyelectrolytes.

A problem found with microcapsules having semipermeable membranes is that part of the core material, including the active materials can leach out with time. This can give rise to interaction among incompatible ingredients and structural changes on the capsules.

Semi-permeable type microcapsules known from the literature do not seem to be strong enough to withstand liquid detergent manufacture processes and transport and at the same time be capable of breaking in use to release the core without leaving residues.

A requirement of liquid detergents containing microcapsules is that the microcapsules should be stably suspended in the liquid matrix. This brings further complexity to the design of the liquid matrix, usually requiring the use of a structurant or a thickening agent that may interact with other ingredients in the liquid matrix potentially impairing the chemical stability of the detergent.

SUMMARY OF THE INVENTION

According to a first aspect the present invention provides microcapsules for use in liquid detergents having a core and a polyelectrolyte complex shell in the form of a semipermeable membrane comprising a particulate permeability-regulator. The particulate permeability-regulator is preferably a microparticulate or nanoparticulate with a particle size of from about 1 nm to about 10,000 nm, preferably from about 10 nm to about 5,000 nm and more preferably from about 100 nm to about 400 nm. The particle size corresponds to the volume average hydrodynamic diameter, i.e. diameter calculated from the hydrodynamic volume, this being the volume of the particle plus its hydration sphere. It can be calculated using dynamic light scattering with a Brookhaven Zeta Plus Analyser. The light scattering is measured at an angle of 90°, at 25° C. during 5 minutes. The microcapsules of the invention have very low permeability cut-off allowing the encapsulation of materials of low molecular weight. The microcapsules can be stored prior to use in a salt solution.

Preferably, the microcapsules of the invention have a liquid core incorporating water and/or organic solvent. When used in a liquid detergent comprising a liquid or gel matrix, the semipermeable membrane permits the transfer of water or solvent between the core and the liquid or gel matrix, by osmotic effect, until equilibrium is substantially reached, thereby contributing to the physical stability of the microcapsules in the detergent matrix. Without being bound by theory, it is believed that when the detergent containing microcapsules is introduced into fresh water, for example during a washing process, the gradient of ionic strength between the wash water and the microcapsule draws water into the core, exerting high pressure on the membrane which consequently disintegrates. This mechanism together with the agitation forces during the washing process contributes to the release of the core material and the disintegration of the shell in use. The disintegration of the microcapsules is independent of the wash water temperature, they disintegrate across the whole range of temperatures met in normal detergent use.

Microcapsules suitable for use in liquid detergent should be physically and chemically compatible with the detergent matrix ingredients and they should disintegrate in use without leaving residues on the clean articles or cleaning devices. In preferred embodiments, the microcapsules are capable of withstanding a force before bursting of from about 20 mN to about 20,000 mN, preferably from about 50 mN to about 15,000 mN and more preferably from about 100 mN to about 10,000 mN. This strength makes them suitable for industrial handling, including liquid detergent making processes. They can withstand pumping and mixing operations without significant breakage and are also stable on transport. At the same time the microcapsules disintegrate readily in use.

The force before bursting that a microcapsule can withstand can be measured by using a Dynamic Mechanical Analyser (Perkin Elmer DMA 7e). A single microcapsule is separated from the storage liquid (0.9% NaCl) and placed on the sample plate of the analyser. The capsule is covered with a drop of a 0.9% sodium chloride solution. To establish the force at the bursting point, a static strain scan is performed applying an increasing force of 20 mN/minute during the microcapsule compression. The imposed force and the displacement of the squeezed capsule are automatically recorded. The point of bursting corresponds to the first shoulder on the static force scan curve and in particular the intersection point of the two tangents constructed as a best fit to the upper and lower lateral portions of the shoulder.

In preferred embodiments the density of the capsules is from about 900 to about 1,300 Kg/m$^3$, more preferably from about 950 to about 1,200 Kg/m$^3$ and especially from about 980 to about 1,100 Kg/m$^3$ at 25° C.

The density of the microcapsules is measured using a Helium Pycnometer (Micromeritics AccuPyc 1330) at 21° C. and 25 psi. A microcapsule is taken from a 0.9% sodium chloride storage solution and gently patted with paper tissue to remove excess liquid before the measurement is taken.

The microcapsules of the invention are preferably essentially spherical in shape, especially when they are suspended in a liquid detergent. In addition the microcapsules preferably have a diameter (measured as equivalent circle diameter) in the range from about 0.2 to about 8 mm, preferably from about 0.5 to about 5 mm and more preferably from about 0.7 to about 4 mm, these ranges being preferred from the viewpoint that the microcapsules can be visualised with the naked eye and from ease of manufacture.

The size and shape of the microcapsules can be characterized using an optical microscope (Leica MZ8) and image analysis system (Leica Q500MC, Quips, UK). Before running the analysis the capsules are taken from a 0.9% sodium chloride solution and placed on the microscope table. During the measurement the capsules are kept wet using a 0.9% sodium chloride solution. Prior to processing of the images, it should be checked that all capsules are detected as single entities. The equivalent circle diameter is the diameter of a circle of an equivalent cross sectional area to that of the particle.

In a preferred embodiment the microcapsules have a degree of elasticity at 25° C. of at least about 30%, more preferably at least about 50% and especially at least about 70%. The elasticity can be calculated using the Dynamic Mechanical Analyser described hereinabove. Elasticity is herein defined as the deformation of the capsule in the direction of movement of the plate before bursting as a percentage of the corresponding undeformed capsule dimension. The elasticity of the microcapsules contribute to their mechanically stability in liquid detergents.

In preferred embodiments the core of the microcapsules includes an active material. Optionally, the shell can also include an active material. Preferably the active material is selected from hydrophobic materials and non-hydrophobic materials having a molecular weight higher than about 3,000. By "hydrophobic material" is herein understood a material having an octanol water partition coefficient, of greater than 1 at 25° C. higher than about 1, preferably higher than about 1.2 and more preferably higher than about 1.5. The octanol water coefficient partition of a material is defined as the ratio of the concentration of the material in the octanol phase to its concentration in the water phase at 25° C. Preferred hydrophobic materials for use herein include perfume oils, silicone fluids and gums, surfactants and vitamin oils. Preferred non-hydrophobic materials having a molecular weight higher than about 3,000 for use herein include enzymes. Other suitable actives include materials set out herein below. The microcapsules can provide protection for the active materials reducing or avoiding interaction between the active material in the core and materials in the liquid matrix of the liquid detergent, thereby improving the chemical stability of sensitive materials such as enzymes and perfumes. The retention of actives in the core of the microcapsules of the invention is higher than that for microcapsules produced by polymeric crosslinking, for example using calcium as crosslinking agent.

Preferably the core of the microcapsules of the invention includes a density modifier in a level such as to reduce the density of the microcapsules by at least about 10%, more preferably at least about 15% at 25° C. The density modifier helps to generate microcapsules of predetermined density which can be suspended in liquid detergents without or with low levels of structuring or thickening agents. By "low level" is meant less than about 5%, preferably less than about 1% and more preferably less than about 0.5% of structuring or thickening agent by weight of the detergent matrix. The density reduction is evaluated by comparing two similar microcapsules, the first one made from a solution containing a given level of density modifier and the second one from a solution wherein the density modifier has been substituted by the same weight of water. Density modifiers suitable herein preferably have a density of less than about 1,000 Kg/m$^3$, more preferably less than about 990 Kg/m$^3$ and higher than about 700 Kg/m$^3$, and especially higher than about 800 Kg/m$^3$. Suitable density modifiers include hydrophobic materials and materials having a molecular weight higher than about 3,000. Preferably the density modifier is insoluble but dispersible either with or without the aid of a dispersant agent, in water. Active materials can play the role of density modifiers if they fulfil the aforementioned requirements. Preferred density modifiers for use herein are selected from the group consisting of silicone oils, petrolatums, vegetable oils, especially sunflower oil and rapeseed oil, and hydrophobic solvents having a density of less than about 1,000 Kg/m$^3$ at 25° C., such as limonene and octane.

In a preferred embodiment the microcapsules have a permeability cut-off in a 0.9 NaCl solution for 3 weeks at of less than about 15,000 Da at 20° C., more preferably less than about 10,200 Da, yet more preferably less than about 3,000 Da and especially less than about 1,000 Da. For the purpose of this invention a microcapsule is considered to have a permeability cut-off of less than a defined value if the microcapsule is capable of retaining at least 80%, preferably at least about 90%, more preferably at least about 95% and especially at least about 97% by weight of the initial amount of a material of certain molecular weight when the capsules are stored in a 0.9M NaCl solution under shaking conditions (50 rpm) at 20° C. for 3 weeks. The permeability cut-off can be evaluated for example by making microcapsules comprising a colorant of known molecular weight, for example 0.1% by weight of Rhodamine B isothiocyanate dextran (MW 10,200) (SIGMA), and storing the microcapsules in a 0.9 M NaCl solution at 20° C. under shaking (50 rpm) for 3 weeks. After 3 weeks the amount of Rhodamine in the store solution is measured by spectrophotometry. Preferably the microcapsules herein have a permeability such that they are capable of retaining at least about 80%, preferably at least about 90%, more preferably at least about 95% and especially at least about 97% of Rhodamine B isothiocyanate dextran (MW 10,200) according to the above test. More preferably the microcapsules herein have a permeability such that they are capable of retaining at least about 80%, preferably at least about 90%, more preferably at least about 95% and especially at least about 97% of Rhodamine B isothiocyanate dextran (MW 3,000).

According to a second aspect of the present invention, there is provided a process for making microcapsules for use in liquid detergents having a core and a polyelectrolyte complex shell in the form of a semipermeable membrane, said microcapsules preferably having a density of from about 900 Kg/m$^3$ to about 1,300 Kg/m$^3$, more preferably from about 950 to about 1,200 Kg/m$^3$ and even more preferably from about 980 to about 1,100 Kg/m$^3$ at 25° C., the process comprising the steps of:

a) forming a first solution comprising a first polyelectrolyte and preferably a density modifier, said solution preferably having a viscosity of from about 0.5 Pa s to about 1,000 Pa s, preferably from about 5 Pa s to about 800 Pa s and more preferably from about 10 Pa s to about 500 Pa s as measured at 1 s$^{-1}$ and 25° C.;

b) adding a particulate permeability-regulator to the first solution resulting from step a);

c) forming droplets of the first solution, the droplets being preferably made by forming and cutting a jet of the first solution; and d) introducing the droplets into a second solution comprising a second polyelectrolyte capable of reacting with the first polyelectrolyte to form a complex at the surface of the droplets.

The term "solution" as used herein includes liquid or gel compositions having a main component and at least a second component dissolved, dispersed or emulsified therein.

The viscosity is measured using a Physica USD200 controlled stress cup and bob rheometer (Z3-25 mm). A shear rate curve is generated at 25° C. 30 measurement points of 10 seconds duration are taken. From this experimental curve the viscosity at 1 s$^{-1}$ is extracted.

Preferably, the density modifier is present in the first solution in a level of from about 5% to about 50%, preferably from about 10% to about 30% by weight.

The first and/or second solutions can comprise any solvent, including water and organic solvents. Preferably, the first and second solutions are aqueous, making the resulting microcapsules easily compatible with the majority of liquid detergents, which are usually aqueous. Preferably, the first and second solutions are aqueous compositions having polyelectrolytes of opposite charge dissolved therein.

The process of the invention is preferably undertaken at ambient temperature thereby reducing the operating costs and allowing the encapsulation of heat sensitive materials.

The process of the invention is quick, simple, versatile, capable of high output and therefore suitable for large-scale production.

Jet cutting allows a high production rate and a narrow distribution of droplet size and permits the handling of solutions of high viscosity, i.e. solutions having viscosity of more than about 200 mPa s, preferably more than about 1,000 mPa s and more preferably more than about 2,000 mPa s as measured at 1 s$^{-1}$ and 25° C. Jet cutting can also handle solutions of complex rheology, for example shear thinning fluids. Preferably the first solution has a shear thinning behaviour, this is preferred from the viewpoint of processability and capsule strength.

In preferred embodiments the jet of the first solution is formed by passing the solution through a nozzle having a diameter of from about 0.2 mm to about 8 mm, more preferably from about 0.5 mm to about 4 mm and a through put rate of from about 0.5 g/s to about 20 g/s, more preferably from about 1 g/s to about 6 g/s.

The jet is preferably cut by mechanical means, especially preferred being rotating cutting wires having a diameter of from about 10 μm to about 1,000 μm, more preferably from about 50 μm to about 500 μm, and a cutting speed of from about 500 rpm to about 10,000 rpm, more preferably from about 1,000 rpm to about 6,000 rpm.

In a preferred embodiment the first solution comprises the first polyelectrolyte in a level of from about 1% to about 15%, more preferably from about 2% to about 10%, especially from about 3% to about 8% by weight of the solution, this level being preferred for both the strength and the low permeability of the resulting microcapsules. Preferably the first polyelectrolyte has a viscosity of at least 100 mPa s, more preferably of at least 300 mPa s as measured at a shear rate of 1 s$^{-1}$ at 25° C. and at a concentration of 1% by weight, this viscosity being preferred for the high strength of the resulting microcapsules. Preferred for the process of the invention are first solutions comprising from about 2% to about 7%%, more preferably from about 3% to about 6%, especially from about 3.5% to about 5% by weight of sodium alginate, said sodium alginate having a viscosity of at least 100 mPa s, preferably of at least 300 mPa s as measured at a shear rate of 1 s$^{-1}$ at 25° C. and at a concentration of 1% by weight.

The second solution preferably comprises a polyelectrolyte selected from poly-(diallyldimethylammonium) salts, chitosan polymers, chitosan oligomers and mixtures of chitosan polymers and oligomers, these polyelectrolytes being preferred for the short reaction time for microcapsule formation, especially preferred being poly-(diallyldimethylammonium), more especially poly-(diallyldimethylammonium) chloride. Microcapsules made from a mixture of chitosan polymer and oligomer, preferably in a weight ratio of from about 5:1 to about 1:1, more preferably from about 3:1 to about 1:3, present both a good strength and a very low membrane permeability. Indeed, the permeability is lower than that for microcapsules made separately from either chitosan oligomer or chitosan in polymeric form.

According to another aspect of the invention, there is provided a liquid detergent composition comprising a liquid or gel matrix incorporating the microcapsules of the invention and from about 0.5 to about 40% by weight of a detergency surfactant. Preferably the detergent composition also includes by weight thereof from about 0.5 to about 40% by weight of a detergency chelant and/or builder. Contrary to most of the widely available microcapsules, based on calcium, for example, the capsules of the invention do not interact with detergent chelants or builders. Thus, the microcapsules are chemically stable in the detergent matrix containing chelants and/or builders avoiding the addition of compensatory extra amounts.

In preferred embodiments the liquid detergent of the invention is stable for 4 weeks at 25° C. Stability can be evaluated by direct observation or by image analysis, by having coloured particles suspended in a transparent liquid contained in a transparent bottle. A detergent freshly made is considered to be stable if less than 10%, preferably less than 5% and more preferably less than 1% by weight of the microcapsules are deposited at the bottom of the bottle after 4 weeks static storage.

Preferably, the liquid detergent is also stable under simulated squeeze usage conditions at 25° C. This can be evaluated according to the following protocol:

500 ml of freshly made liquid detergent is packed in a 500 ml flat-sided liquid detergent bottle typically used for dishwashing liquid (Fairy liquid).

Squeeze, by inverting approximately 135° and squeezing the liquid detergent bottle at once, approximately 1.5 grams (+/− 0.5 g) of the liquid detergent in a measuring beaker.

Repeat this 3 times (1 minute in between each squirt).

Leave the bottle to rest for 13 minutes.

Repeat the above steps, but alternating the tilting side of the bottle.

Repeat until the bottle is ¾ empty.

If less than 10%, preferably less than 5% and more preferably less than 1% by weight of the microcapsules are deposited at the bottom of the bottle the liquid detergent is considered to be stable under simulated squeeze usage conditions.

In highly preferred embodiments the difference between the density of the liquid matrix and the microcapsules is less than about 10%, more preferably less than about 5% and yet more preferably less than about 3% at 25° C. This contributes to the stability of the microcapsules in the liquid detergent and minimizes or avoids the need for structuring or thickening agent. Preferably, the liquid matrix comprises less than about 5%, more preferably less than about 1% and especially less than about 0.5% of structuring or thickening agent.

Finally, there is provided a process for making the liquid detergent of the invention comprising the step of adding the microcapsules of the invention to a liquid or gel matrix wherein the density difference at 25° C. of the matrix and the microcapsules, before they are added to the liquid matrix (measured as described hereinabove), is less than about 30%, preferably less than about 20%, more preferable less than about 10% and especially less than about 5%. In highly preferred embodiments, the microcapsule density prior to addition to the liquid matrix is equal to or within about 1% or 2% thereof as the microcapsule density can change slightly during storage in the liquid detergent.

DETAILED DESCRIPTION OF THE INVENTION

The present invention envisages microcapsules for use in liquid detergents, a process for making them and liquid detergents comprising said microcapsules. The microcapsules have an outstanding low permeability that makes them suitable for the encapsulation of materials of a wide molecular range, including materials of low molecular weight. The microcapsules are also very stable in liquid detergents over long periods; however they break, releasing the core material, in use without leaving residue.

The term liquid detergent as used herein includes all flowable fluids having cleaning properties, including liquids and gels for use in manual and automatic laundry, dishwashing, hard surface cleaning, personal cleansing and lavatory rim-blocks.

Suitable particles for use as permeability-regulator are particles having the particle size defined herein above. It is preferred that the particles additionally have a secondary role such as: i) an active role in the cleaning process, thus preferred particles can act as dye transfer inhibitors, anti-microbial agents, soil release agents, finishing agents, etc; or ii) a physical role in modifying the appearance of the capsules, preferred for this use being pigments and insoluble colorants.

Preferred particle permeability-regulators include pigments, especially opacifying and tinctorial pigments. Suitable opacifying pigments for use herein include, for example, titanium dioxide, lithopone, zinc sulfide, lead titanate, antimony oxide, zirconium oxide, titanium calcium, white lead, titaniunm barium zinc oxide and leaded zinc oxide. Titanium dioxide is especially preferred. Tinctorial pigments for use herein include ferrite yellow oxide, ferric oxide, brown iron oxide, tan iron oxide, raw sienna, burnt sienna, chromium oxide green, copper phthalonitrile blue, phthalocyanine green, ultramarine blue, carbon black, lampblack, toluidine red, parachlor red, cadmium reds and yellows, as well as organic pigments such as phthaloorganamine blue and greens. Ultramarine blue is especially preferred.

Other particle permeability-regulators suitable for use herein include silicas, clays and talcs.

The microcapsules of the invention are made by a process based on the reaction of two polyelectrolytes of opposite charge (herein also referred as polyanions and polycations) and which are capable of forming a complex. Suitable polyelectrolytes for the present invention can be synthetic or natural polyelectrolytes.

Suitable anionic synthetic polyelectrolytes may be selected from the group consisting of polyacrylates and polymethacrylates, polyvinyl sulphates, polystyrene sulphonates, polyphosphates and mixtures thereof.

Suitable cationic synthetic polyelectrolytes may be selected from the group consisting of poly-(N,N,N-trialkylammoniumalkyl) acrylates, poly-(N-alkylpyridinium) salts, polyethylenimines, aliphatic ionenes, poly-(diallyldialkylammonium) salts and mixtures thereof, wherein the alkyl is preferably short chain with from 1 to about 4 carbon atoms, preferably methyl.

Suitable anionic natural polyelectrolytes may be selected from anionic gums. Suitable anionic gums include alginates, carrageenan, gellan gum, carboxylmethyl cellulose, xanthan gum and mixtures thereof.

Suitable cationic natural polyelectrolytes may be selected from the group consisting of chitosan, chitosan derivatives such as quaternarised chitosan and aminoalkylated and quaternarised celluloses and poly-L-lysine and mixtures thereof.

Preferred for use herein are the combinations of sodium alginate (for the first solution) with poly-(diallyldimethylammonium) chloride, chitosan polymer (having a molecular weight of from about 10 to 1,000 kDa, preferably from about 50 to 500 kDa), chitosan oligomer (having a molecular weight of from about 300 to about 9,000 Da, preferably from about 500 to about 5,000 Da) or a mixture of chitosan polymer and oligomers (for the second solution). These combinations are preferred for the short reaction time and for the low permeability of the resulting microcapsules, especially preferred being combinations of sodium alginate with poly-(diallyldimethylammonium) chloride. Membrane permeability is preferably as to allow the transfer of water or solvent between the liquid detergent and the core of the microcapsule but to preclude the leaching out of actives.

The solutions used in the process of the invention can be prepared by using any solvent, however aqueous solutions are preferred for reasons of availability and environmental profile and because of the compatibility of water with the majority of active substances and liquid detergents. The process is preferably carried out at ambient temperature, this being advantageous when dealing with heat sensitive materials such as perfumes and enzymes.

However, if non-heat sensitive materials are encapsulated the solutions of the process can be heated in order to speed the kinetics of the complexation reaction.

The first solution preferably comprises a density modifier and/or an active material, dissolved, suspended or emulsified therein. The first solution can also comprise a dispersant or emulsifier, especially if the active material is hydrophobic, in order to facilitate the suspension or emulsification process, preferred dispersants for use herein being polymers, especially polyvinyl alcohol. Preferred emulsifiers for use herein are surfactants. Dispersants and/or emulsifiers are usually used in low levels, suitable levels for use herein being from about 0.1 to about 5%, preferably from about 0.2 to about 3% by weight of the first solution.

Actives suitable for use herein include any substance that contribute to the cleaning process such as surfactants, enzymes, builders and bleaching agents; and substances that provide additional benefits, such as suds suppressers, perfumes, especially perfume oils, vitamins, anti-microbial agents, color protection agent, care additives, finishing agents, especially fabric softening, drying and shine additives.

The microcapsules are preferably coloured comprising dyes and/or pigments so they can be readily visualised when placed in liquid detergents.

Droplets can be formed by any known method. Preferably the droplets are formed by extruding the first solution through a nozzle into a coherent jet and cutting the jet, by cutting means, into cylindrical segments, which then form droplets, due to surface tension, on their way to the second solution. Preferred cutting means include rotating cutting wires. Suitable methods and devices for forming the droplets are described in DE 44 24 998 and WO 00/48722.

Usually the volume of second solution is at least 10 times, preferably at least 100 times and more preferably at least 1,000 times larger than that of a droplet, therefore, the amount of the second polyelectrolyte is well in excess over that of the first polyelectrolyte, thus the concentration of the polyelectrolyte in the second solution is not critical. Preferably the concentration of the second polyelectrolyte is from about 0.5% to about 5%, more preferably from about 0.8% to about 2% by weight of the solution. The pH of the second solution is selected according to the pH conditions for dissolution of the second polyelectrolyte. The residence time of the droplets is adjusted according to the desired shell thickness. Usually the reaction takes place under agitation conditions.

The liquid detergents of the invention comprise from about 0.5 to about 30%, preferably from about 1 to about 20% microcapsules by weight of the compositions. Suitable surfactants for use in the liquid detergents of the invention are well known and can be selected from anionic, nonionic, amphoteric and cationic surfactants, depending on the specific application of the detergent.

Builders suitable for use in the liquid detergents of the invention include builders that form water-soluble hardness ion complexes (sequestering builder) such as citrates and polyphosphates e.g. sodium tripolyphosphate and sodium tripolyphosphate hexahydrate, potassium tripolyphosphate and mixed sodium and potassium tripolyphosphate salts; and builders that form hardness precipitates (precipitating builder) such as carbonates e.g. sodium carbonate. Chelating agents can be selected from the acid or salt forms of organic phosphonates and aminophosphonates, aminocarboxylates, polyfunctionally-substituted aromatic compounds, and mixtures thereof.

The detergent compositions herein can additionally comprise one or more detergent active or auxiliary components. Detergent actives may be selected from traditional detergent ingredients such as bleaching systems (including bleaching agents and bleach activators), alkalinity sources, enzymes, etc. Detergent auxiliaries may be selected from finishing agents and care agents. Some of these ingredients can be used in either or both of the microcapsules and the matrix of the liquid detergent.

Preferably, the detergent matrix is transparent containing colored capsules and packaged in a clear/transparent package.

Examples 1 to 3

Microcapsules were made by forming droplets of a first solution (compositions given in Table 1) with a syringe connected to a needle and allowing the droplets to fall into a 1% by weight chitosan (Chitoclear ex Primex) solution adjusted to pH 2.5 with 1N acetic acid solution. The capsules (about 1.5 mm diameter) were kept into an agitated chitosan solution, under magnetic stirrer conditions (250 rpm) in a 250 mL beaker using a 4 cm magnetic bar, for 15 minutes. Thereafter the capsules were separated, by filtration, washed with distilled water and transferred to a 0.9 M NaCl solution. The microcapsules containing solution was stored under shaking (50 rpm) at 20° C. The amount of Rhodamine B in the storage solution after 3 weeks was measured by spectrophotometry ($\lambda$=555 nm). The microcapsules have a permeability cut-off of less than 10,200 Da (at least about 95% of Rhodamine B is retained).

TABLE 1

| Ingredient (% weight) 1st solution | Example 1 | Example 2 | Example 3 |
| --- | --- | --- | --- |
| Alginate | 3 | 3 | 3 |
| Rhodamine B | 0.1 | 0.1 | 0.1 |
| Acusol | 1.5 | | |
| Monastral | | 1.5 | |
| Mirapol | | | 1.5 |
| Water | to 100 | to 100 | to 100 |
| Rodamine B retained (%) | 97 | 95 | 97 |

Alginate: sodium alginate, grade CHN420 from Bright Moon Seaweed Industrial Co. Ltd., Qingdao
Rhodamine B: Rhodamine B isothiocyanate dextran (MW 10200) from SIGMA
Acusol: Acusol OP 301 (aqueous solution containing 40% by weight of 224 nm styrene/acrylic nanoparticles) from Rohm and Hans, UK, LTD
Monastral: (aqueous solution containing 40% by weight of 239 nm phthalocyanine blue pigment nanoparticles) from Heubach
Mirapol: Mirapol CP1 (aqueous solution containing 29.5% by weight of 18 nm styrene/acrylic nanoparticles) from Rhodia Example 4

160 grams of polyvinyl alcohol (PVA), Mowiol 3-83 ex Clariant and 300 grams of Acusol (aqueous solution containing 40% by weight of 224 nm nanoparticles) were dispersed into 14406 grams of de-ionized water and dissolved at 60° C. 760 grams of sodium alginate from brown algae (ex Fluka product code 71238) was added to the PVA solution and mixed. 4600 grams of polydimethyl siloxane (PDMS), Dow Corning 200 fluid 100.000 cSt ex Dow Corning was mixed with the alginate/PVA mixture to form a high viscous solution.

The above solution was extruded at throughput of 4.87 g/s through a 1.0 mm nozzle and cut using a rotational cutting tool containing 24 wires of 200 micron thickness ex GeniaLab with a cutting speed of 3150 rpm to form spherical droplets with a diameter between 1000 and 1500 microns using a mechanical cutting device (JetCutter from GeniaLab) and the droplets allowed to fall into an agitated hardening bath that contained 10 litres of a 1% chitosan solution (Chitoclear ex Primex) brought to pH 2.5 with HCl.

Example 5

Filtered microcapsules of Example 4 were stirred into the laundry liquid detergent prepared as described herein below. The microcapsules remained homogeneously suspended in the liquid detergent and the PDMS remained enclosed within the capsule. The density of the liquid detergent was 1,035 Kg/m$^3$.

A structured liquid detergent matrix is prepared by combining an aqueous premix of conventional heavy duty liquid (HDL) detergent composition components with a structuring agent premix. Each of these two premixes is prepared as follows:

The HDL components premix is prepared by combining HDL components with water in a suitable vessel under suitable agitation. The resulting premix has the composition shown in Table I.

TABLE I

HDL Components Premix

| Component | Concentration (Wt %) |
| --- | --- |
| $C_{12}$LAS | 7.5 |
| $C_{14-15}E0_8$ Alcohol Ethoxylate | 5.2 |
| $C_{12-14}$Amine Oxide | 2.9 |
| Citric Acid | 4.3 |
| $C_{12-18}$ Fatty Acid | 5.2 |
| Enzymes (Protease, Amylase, Mannanase) | 0.6 |
| MEA-Borate | 2.4 |
| DTPMP[1] Chelant | 0.6 |
| Ethoxylated Polyamine Dispersants | 1.5 |
| Silicone/Silica Suds Suppressor | 0.02 |
| Ethanol | 1.4 |
| Propane Diol | 3.6 |
| NaOH | 6.1 |
| Perfume, Brightner, Hydrotrope, Colorant, Other Minors | 4.2 |
| Water | Balance to 100% |

[1]Sodium diethylene triamine penta (methyl phosphonate)

The structuring agent premix is prepared by combining hydrogenated castor oil and the other structuring agent premix ingredients shown in Table II with water under certain conditions. In particular, the Table II components except for the hydrogenated castor oil are combined and the resulting mixture is heated to 90° C. The hydrogenated castor oil is then added and the mixture is maintained under agitation until all of the hydrogenated castor oil has been emulsified. After full emulsification, the mixture is flash cooled to 70° C. and left at this temperature until all of the hydrogenated castor oil is re-crystallized. At this point the structuring agent premix is allowed to cool down slowly to ambient temperature. The resulting structuring agent premix has the composition shown in Table II.

TABLE II

Structuring Agent Premix

| Component | Concentration (Wt %) |
| --- | --- |
| Hydrogenated Castor Oil | 4.0 |
| $C_{12}$HLAS | 16.0 |
| Sodium Metaborate | 1.5 |
| NaOH | 3.5 |
| Water | Balance to 100% |

As a next step, 2.5 parts of the structuring agent premix of Table II are added slowly to 96.5 parts of the HDL components premix of Table I under slow agitation forming the structured detergent matrix.

The microcapsules which are formed in accordance with the procedure of Example 4 are combined with the structured aqueous liquid detergent composition matrix. This is accomplished by slowly adding the microcapsules to the structured liquid matrix while it is maintained under gentle agitation. Enough microcapsules are added to constitute 1% by weight of the composition which is formed. The resulting heavy duty liquid laundry detergent product has the composition shown in Table III.

TABLE III

Microcapsule-Containing Liquid Laundry Detergent

| Component | Concentration (Wt %) |
| --- | --- |
| C12LAS | 7.9 |
| C14-15E08 Alcohol Ethoxylate | 5.7 |
| C12-14Amine Oxide | 1.0 |
| Citric Acid | 2.0 |
| C12-18 Fatty Acid | 5.2 |
| Enzymes (Protease, Amylase, Mannanase) | 0.6 |
| MEA-Borate | 1.5 |
| DTPMP1 Chelant | 0.2 |
| Ethoxylated Polyamine Dispersants | 1.2 |
| Silicone/Silica Suds Suppressor | 0.002 |
| Ethanol | 1.4 |
| Propane Diol | 5.0 |
| NaOH | 3.2 |
| Hydrogenated Castor Oil | 0.1 |
| Microcapsules from Example 4 | 1.0 |
| Perfume, Brightner, Hydrotrope, Colorant, Other Minors | 4.2 |
| Water | Balance to 100% |

60 ml of the microcapsules-containing liquid detergent was added into a dosing ball and the dosing ball was covered with a fine mesh cloth that allowed water to enter into the dosing ball but precluded the capsules from getting out. The dosing ball was added to a regular wash cycle (30° C.). After 10 minutes the washing machine was stopped and the dosing ball was checked. It was observed that all the capsules had disintegrated and there was no sign of residues in the dosing ball or on the cloth covering the dosing ball.

Example 6

40 grams of polyvinyl alcohol (PVA), Mowiol 3-83 ex Clariant and 75 grams of Acusol (aqueous solution containing 40% by weight of 224 nm nanoparticles) were dispersed into 3610 grams of de-ionized water and dissolved at 60° C. 190 grams of sodium alginate from brown algae (ex Fluka product code 71238) was added to the PVA solution and mixed. 1150 grams of polydimethyl siloxane (PDMS), Dow Corning 200 fluid 100.000 cSt ex Dow Corning was mixed with the alginate/PVA mixture to form a high viscous solution.

The above solution was extruded at throughput of 2.75 g/s through a 0.6 mm nozzle and cut using a rotational cutting tool containing 24 wires of 200 micron thickness ex GeniaLab with a cutting speed of 6000 RPM to form spherical droplets with a diameter between 1000 and 1500 microns using a mechanical cutting device (JetCutter from GeniaLab) and the droplets allowed to fall into an agitated hardening bath that contained 10 litres of a 1% chitosan solution (Chitoclear ex Primex) brought to pH 2.5 with HCl.

After a hardening time of 15 minutes, the microcapsules were separated from the chitosan solution via filtration, washed with plenty of de-ionized water and stored in a 0.9 NaCl solution.

Example 7

The following compositions form part of a lavatory bowl rim-block comprising a container; a liquid composition; and a dispensing means connected to the container for dispensing the liquid composition. Each of the liquid compositions includes 1% of the microcapsules of Example 6.

| Ingredients | Weight % |
|---|---|
| Kelzan T ® | 0.5 |
| Dobanol 91.8 ® | 15 |
| HLAS | 1 |
| Na HEDP | 0.5 |
| SF 1288 ® | 5.0 |
| Perfume | 12 |
| pH of 6 adjusted with NaOH/H2SO4 | |
| Acusol 800S ® | 3 |
| Steol CS-330 ® | 20 |
| NaOH | 0.5 |
| DTPMP | 2 |
| DC193 ® | 10 |
| Perfume | 8 |
| Natrosol HHR ® | 0.5 |
| Dobanol 91.8 | 1 |
| Daclor 70-3-23 ® | 15 |
| DTPA | 1.5 |
| DC 5220 ® | 7 |
| Perfume | 10 |
| Kelzan T ® | 0.6 |
| Dobanol 91.8 ® | 20 |
| Silicone SF 1188 ® | 7 |
| Na2 HEDP | 2 |
| Natrosol HHR | 0.45 |
| Trilon FS ® | 1.3 |
| Silicone SF 1288 ® | 7.0 |
| Marlinat 242/90 ® | 10 |
| Nansa LSS 38/AS ® | 1 |
| Perfume | 5 |
| Acusol 800S ® | 0.5 |
| Perfume | 7 |
| ssEDDS | 0.5 |
| EMPICOL LX 28 ® | 20 |
| SF 1288 ® | 10 |
| Kelcogel F ® | 0.02% |
| Perfume | 7% |
| Marlinat 242/90 ® | 12 |
| Dobanol 91.8 ® | 2% |
| Kelzan T ® | 0.3% |

Dobanol 23-3 is a $C_{12}$-$C_{13}$ EO3 nonionic surfactant, Dobanol 45-7 is a $C_{14}$-$C_{15}$ EO7 nonionic surfactant, Dobanol 91-8 is a $C_9$-$C_1$ EO8 nonionic surfactant and Dobanol 91-10 is a $C_9$-$C_{11}$ EO10 nonionic surfactant, all commercially available from SHELL.

Na HEDP is Sodium ethane 1-hydroxy diphosphonate.

DTPMP is diethylene triamine penta methylene phosphonate.

DTPA is diethylene triamine pentaacetate.

ssEDDS is ethylenediamine N,N'-disuccinic acid.

SF 1288® and SF 1188® are Silicones-Polyethers copolymers, commercially available from GE Bayer Silicones.

Kelzan T® is Xanthan Gum and Kelcogel F® is gellan gum, both commercially available from CP-Kelco.

HLAS is a linear alkylbenzene sulphonic acid anionic surfactant.

DC 5220® and DC193® are silicone glycol polymers commercially available from Dow Corning.

Acusol 800S® is a hydrophobically-modified acrylate polymer commercially available from Rohm & Haas.

Natrosol HHR® is a hydroxycellulose commercially available from Hercules Daclor 70-3-23® is a branched alkyl ethoxylated sulfate and Marlinat 242/90® is an alkyl ethoxylated sulfate, both are commercially available from Sasol.

Steol CS-330® is an alkyl ethoxylated sulfate commercially available from Stepan.

Trilon FS® is an amino carboxylate commercially available from BASF.

Nansa LSS 38/AS® is an alpha-olefin sulfonate and EMPICOL LX 28® is an alkyl sulfate, both are commercially available from Huntsman.

Example 8

40 grams of polyvinyl alcohol (PVA), Mowiol 3-83 ex Clariant and 70 grams of Acusol (aqueous solution containing 40% by weight of 224 nm nanoparticles) were dispersed into 3610 grams of de-ionized water and dissolved at 60° C. 190 grams of sodium alginate from brown algae (ex Fluka product code 71238) was added to the PVA solution and mixed. 1150 grams of polydimethyl siloxane (PDMS), Dow Corning 200 fluid 100.000 cSt ex Dow Corning was mixed with the alginate/PVA mixture to form a high viscous solution.

The above solution was extruded at throughput of 2.75 g/s through a 0.6 mm nozzle and cut using a rotational cutting tool containing 24 wires of 200 micron thickness ex GeniaLab with a cutting speed of 6000 RPM to form spherical droplets with a diameter between 1000 and 1500 microns using a mechanical cutting device (JetCutter from GeniaLab) and the droplets allowed to fall into an agitated hardening bath that contained 10 litres of a 1% chitosan solution (Chitoclear ex Primex) brought to pH 2.5 with HCl.

After a hardening time of 15 minutes, the microcapsules were separated from the chitosan solution via filtration, washed with plenty of de-ionized water and stored in a 0.9 NaCl solution.

Example 9

Each of the following liquid compositions for use in manual dishwashing includes 0.1% of the microcapsules of Example 8. The compositions are stable for 4 weeks at 25° C. and under usage conditions (according to the aforementioned test).

| Igredient | Weight % | Weight % | Weight % | Weight % | Weight % |
|---|---|---|---|---|---|
| Sodium Alkyl Ethoxy Sulfate | 26.5 | 26.5 | 26.5 | 26.5 | 26.5 |

-continued

| Igredient | Weight % | Weight % | Weight % | Weight % | Weight % |
|---|---|---|---|---|---|
| Alkyl Dimethyl Amine Oxide | 6 | 6 | 6 | 5 | 6 |
| Alcohol Ethoxylated Nonionic | 2 | 2 | 2 | 2 | 2 |
| Gellan Gum | — | 0.02 | — | — | 0.02 |
| Hydrophobically Modified Polyacrylate | — | — | — | 2.0 | — |
| Hydrogenated Castor Oil | — | — | 0.1 | — | 0.02 |
| Ethanol | 3.0-4.5 | 3.0-4.5 | 3.0-4.5 | 4.5 | 3.0-4.5 |
| Polypropylene Glycol 2000 MW | 0.8 | 0.8 | 0.8 | 1 | 0.8 |
| Sodium Chloride | 1.2 | 1.2 | 1.2 | 1 | 1.2 |
| Sodium Cumene Sulfonate | 1.8 | 1.8 | 1.8 | 1 | 1.8 |
| 1,3-Bis (aminomethyl) cyclohexane | 0.5 | 0.5 | 0.5 | 0.5 | 0.5 |
| Suds boosting polymer | 0.2 | 0.2 | 0.2 | 0.2 | 0.2 |

What is claimed is:

1. A liquid detergent comprising microcapsule, said microcapsule comprising a core and a polyelectrolyte complex shell in the form of a semipermeable membrane comprising a particulate permeability-regulator, said regulator being a tinctorial pigment, wherein said permeability-regulator has a volume average hydrodynamic diameter of from 100 nm to about 5,000 nm, wherein the microcapsule has a density of from about 800 Kg/m³ to about 1,300 Kg/m³ at 25° C.

2. The liquid detergent according to claim 1 wherein said microcapsule is capable of withstanding a force before bursting of from about 20 mN to about 20,000 mN.

3. The liquid detergent according to claim 1, wherein said microcapsule has a diameter in the range from about 0.2 to about 8 mm and a degree of elasticity at 25° C. of at least about 40%.

4. The liquid detergent according to claim 1, wherein the core includes an active material selected from the group consisting of hydrophobic materials inclusive of perfume oils, silicone fluids and gums, surfactants and vitamin oils and non-hydrophobic materials having a molecular weight higher than about 3,000 inclusive of enzymes.

5. The liquid detergent according to claim 1 wherein the core includes a density modifier effective in reducing the density of the microcapsule by at least about 10% at 25° C.

6. The liquid detergent according to claim 1 wherein the shell comprises a polyanion-polycation polyelectrolyte complex.

7. The liquid detergent according to claim 1 wherein the microcapsule has a permeability cut-off in a 0.9 NaCl solution for 3 weeks of less than 10,000 Da at 25° C.

8. A process for making liquid detergent comprising microcapsules having a core and a polyelectrolyte complex shell in the form of a semipermeable membrane comprising a particulate permeability-regulator, the process comprising the steps of: a, forming a first solution comprising a first polyelectrolyte; b, adding a particulate permeability-regulator, said regulator being a tinctorial pigment having a volume average hydrodynamic diameter from 100 nm to about 400 nm, to the first solution; c, forming droplets of the first solution; and d, introducing the droplets into a second solution comprising a second polyelectrolyte capable of reacting with the first polyelectrolyte to form a complex at the surface of the droplets, wherein the microcapsules have a density of from about 900 Kg/m³ at 25° C.

9. A process according to claim 8 wherein the first solution comprises from 0.05% to 5% of the particulate permeability-regulator.

10. A process according to claim 8 wherein the first solution has a viscosity of from about 0.5 to about 1,000 Pa s as measured at 1 s⁻¹ and 25° C.

11. A process according to claim 8 wherein the first solution comprises from about 2% to about 7% by weight of sodium alginate, said sodium alginate having a viscosity of at least 100 mPa s as measured at a shear rate of 1 s⁻¹ at 25° C. and at a concentration of 1% by weight.

12. A process according to claim 8 wherein the second solution comprises a polyelectrolyte selected from the group consisting of poly-(diallyldimethylammonium) salts, chitosan polymers, chitosan oligomers and mixtures of chitosan polymers and oligomers.

13. A liquid detergent composition comprising a liquid or gel matrix incorporating the microcapsule of claim 1 and from about 0.5 to about 40% by weight of a detergency surfactant.

14. A liquid detergent according to claim 13 wherein the microcapsule is stable under static storage conditions for 4 weeks at 25° C.

15. A liquid detergent according to claim 13 wherein the microcapsule is stable under simulated squeeze usage conditions.

16. A liquid detergent according to claim 13 wherein the detergent matrix is essentially free from structuring or thickening agent.

17. A liquid detergent according to claim 13 wherein the density of the liquid matrix is within about 10% of that of the microcapsule.

* * * * *